United States Patent [19]

Sakurai et al.

[11] Patent Number: 4,675,239

[45] Date of Patent: Jun. 23, 1987

[54] PERPENDICULAR MAGNETIZATION FILM

[75] Inventors: Yoshifumi Sakurai, Mino; Koji Saiki, Toyonaka, both of Japan

[73] Assignees: Yoshifumi Sakurai; Kanegafuchi Kagaku Kogyo Kabushiki Kaisha, both of Osaka, Japan

[21] Appl. No.: 743,134

[22] Filed: Jun. 10, 1985

[30] Foreign Application Priority Data

Jun. 12, 1984 [JP] Japan ................................ 59-120391

[51] Int. Cl.$^4$ ............................................. B21C 37/00
[52] U.S. Cl. ...................................... 428/607; 428/611; 428/652; 428/928; 148/31.55; 148/403; 360/135; 204/192 M
[58] Field of Search ............... 428/607, 611, 652, 928; 148/31.55, 31.57, 403; 204/192 M; 360/135

[56] References Cited

U.S. PATENT DOCUMENTS 4,126,494 11/1978 Imamura et al. ................. 148/31.57
4,469,536 9/1984 Forester ............................ 148/403

FOREIGN PATENT DOCUMENTS 53-104897 9/1978 Japan .................................... 148/403
58-27941 2/1983 Japan .................................. 148/31.55
59-208706 11/1984 Japan .................................. 148/31.55

Primary Examiner—John P. Sheehan
Attorney, Agent, or Firm—Armstrong, Nikaido, Marmelstein & Kubovcik

[57] ABSTRACT

A perpendicular magnetization amorphous thin film of an alloy of samarium, cobalt and bismuth having an easy magnetizing axis perpendicular to a plane of substrate, and the preparation thereof. According to the thin film, a large saturation magnetization is obtained along an easy magnetizing direction perpendicular to the plane of substrate. The thin film can be prepared by depositing samarium, cobalt and bismuth on the substrate without any applying a bias voltage to the substrate.

2 Claims, 1 Drawing Figure

PERPENDICULAR MAGNETIZATION FILM

BACKGROUND OF THE INVENTION

The present invention relates to a magnetic film comprising an amorphous magnetic thin film having an easy magnetizing axis perpendicular to a plane of substrate, and the preparation thereof.

Especially, the present invention relates to a perpendicular magnetization film comprising an amorphous magnetic thin film suitably used as a high density magnetic storage as so-called perpendicular magnetic storage, opto-magnetic storage, or the like.

Hitherto, a cobalt thin film containing chromium of a little less than 20 atomic % has been investigated for a perpendicular magnetic storage. A thin film composed of an alloy of cobalt and chromium prepared by a sputturing method, and the like is known to be capable of recording high density-information and to be corrosive resistant.

The maximum value of the perpendicular uniaxial anisotropy constant Ku of the above-mentioned alloy film of cobalt and chromium is about $2 \times 10^6$ erg/cm$^3$. In order that an easy magnetizing direction is perpendicular to substrate, a relationship $Ku-2\pi Ms^2 > 0$ must be satisfied, wherein Ms indicates saturation magnetization. As a result, the maximum value of Ms of a perpendicular magnetization film of an alloy of cobalt and chromium is about 700 gausses.

For reading a stored information, an intensity of a detected signal is considered to be proportional to Ms. Thus, a larger Ms brings a favarable magnetic storage.

An alloy of samarium and cobalt, that is, a composite of SmCo$_5$, constitutes a hexagonal crystal, where c-axis is a direction of easy magnetization, and the uniaxial magnetic anisotropy constant reaches to a level of 10$^8$ erg/cm$^3$. In an amorphous alloy of samarium and cobalt, a large anisotropy is also expected. By turning an easy axis of the thin amorphous film to the perpendicular direction to the substrate, one can obtain a perpendicular magnetization thin film of large Ms. In addition, a large anisotropy of a magnetic thin film causes a large coercive force. Therefore, it realizes the stabilities of written information bits.

However, when a deposition of an alloy of samarium and cobalt is performed using an ordinary method such as electron-beam-evaporation or sputtering, the easy magnetizing direction is readily parallel to the substrate. Thus a perpendicular magnetization film cannot be obtained. Recently it is recognized that a perpendicular magnetization film can be prepared in sputtering by applying a negative bias voltage to the substrate. However, in that method, another circuit for supplying a voltage must be provided since a substrate is an insulator in most cases, so that the preparation process becomes complicated. More than anything else, a perpendicular magnetization film cannot be obtained by way of registance heating- or electron beam heating-evaportion.

An object of the present invention is to provide a perpendicular magnetization film without any applying a bias voltage in its preparation process.

SUMMARY OF THE INVENTION

The present invention relates to perpendicular magnetization film comprising an amorphous magnetic thin film of an alloy of samarium, cobalt and bismuth, having an easy magnetizing axis perpendicular to a plane of substrate, and further relates to the preparation of the above described film by depositing samarium, cobalt and bismuth onto the substrate.

DETAILED DESCRIPTION

Figure 1:
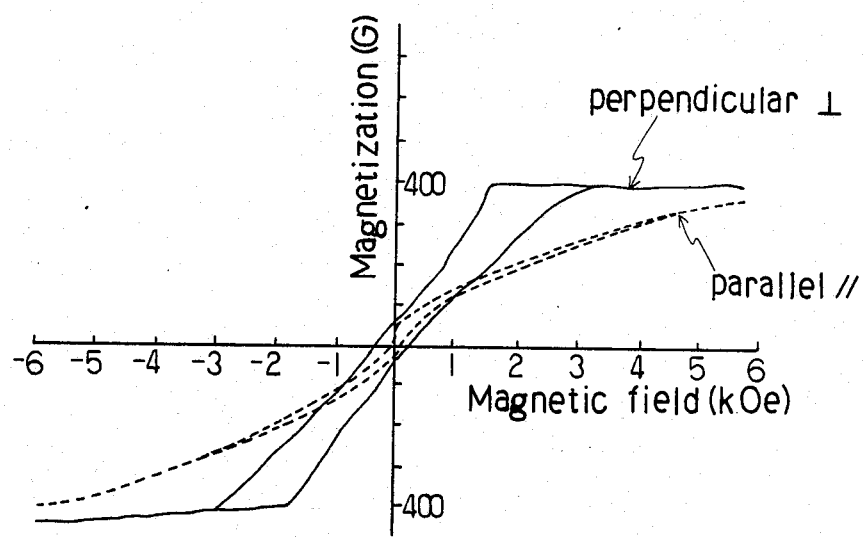
FIG. 1 is a graph of magnetization curves of a thin film of an alloy of samarium, cobalt and bismuth of the formula of $(Sm_{16}Co_{84})_{62}Bi_{38}$. The continuous line indicates the magnetization along an easy magnetizing direction (perpendicular to the film), and the dashed line indicates the magnetization along a hard magnetizing direction (parallel to the axis).

In the present invention, a perpendicular magnetization film is prepared from an alloy of samarium, cobalt and bismuth. A content of bismuth of the alloy is preferably 0.1 to 40 atomic %, and more preferably 1 to 20% atomic %. When the content is less than 0.1 atomic %, the effect of adding bismuth is not practically recognized. An addition of bismuth more than 40 atomic % results in a reduction of saturation magnetization. And the deposited magnetic thin film is easily peeled off from the substrate.

A proportion of samarium to the alloy is preferably 5 to 50 atomic %, and more preferably 10 to 40 atomic %. When a proportion of samarium is below 5 atomic %, an anisotropy constant Ku of the alloy tends to become large. However, Ms also becomes large, so that Ku-$2\pi Ms^2$ remains negative. As a result, a perpendicular magnetization film cannot be obtained. On the other hand, when a samarium is above 50 atomic %, both Ku and Ms are decreased. A material having low Ku and Ms produces an unsuitable magnetic film as a data storage.

A perpendicular magnetization film of the above described components in the invention is prepared on a substrate by sputtering, electron-beam-heating-evaporation, ion plating or the like.

For a substrate, not only an aluminum plate or a glass plate but also a plastic plate or film injected from polymethylmethacrylate, polyimide, polycarbonate and the like can be readily used, as well.

Thereafter, a perpendicular magnetization film of samarium, cobalt and bismuth is provided on the substrate through the following sputtering processes.

In the present invention, a precise control of the contents of samarium, cobalt and bismuth is very important. Target (cathode) of sputtering is optionally adopted singularly or plurally. When single target is used, a bismuth plate is set on the cathode or the backing plate. On the bismuth plate, cobalt plate with many holes and samarium chips are put down respectively. By changing the number of the chips or holes, the composition of the magnetic film is optionally controlled. When plural targets are employed, the composition of the film can be controlled by choosing a power applied to every target. Furthermore a target of an alloy of any compositions of samarium, cobalt or bismuth can be alternatively used. In a single target type or plural target type of sputtering apparatus, the homogeneity of the film is maintained by rotating the substrate above the target.

Sputtering is performed under a pressure of $1 \times 10^{-3}$ to $1 \times 10^{-2}$ Torr of argon. With respect to an enlargement of the anisotropy, a lower pressure is more favorable.

Furthermore, for reducing the crystallization of the magnetic film, it is preferable that a substrate is not too much heated, e.g. 0° C. to 200° C., and sputtering rate is not too fast, e.g. 10 Å to 10,000 Å per minute. Excepting the above stated matters, the sputtering conditions in the invention is not different from those in an ordinary sputtering.

A thickness of the film is preferably 100 Å to 10,000 Å. When the thickness of the film is below 100 Å, a leakage flux is so small that a sensitivity for reading out the written informations is low. On the other hand, when the thickness is more than 10,000 Å, it will be difficult to write down the information throughout the magnetic film. Thus, using a film of more than 10,000 Å results in a waste of material.

A protection layer of silicon, silicon oxide, silicon nitride, or the like can be provided onto a deposited film. The reason for providing the protection layer is that the film of the invention is weak to the oxidation since it includes samarium and cobalt.

The perpendicular magnetization film of the invention has the following characteristics:

First, a mangetic film with a large perpendicular anisotropy can be obtained by adding bismuth. When bismuth is not added, a perpendicular magnetization film cannot be obtained because a perpendicular uniaxial anisotropy constant Ku will be less than $-1 \times 10^6$ erg/cm$^3$. However, by adding bismuth, Ku will be increased over $1 \times 10^6$ erg/cm$^3$ in proportion to the content of bismuth. In general, large magnetic anisotropy constant is obtained when a concentration of samarium is small. However, in that case, the value of Ms is so large that Ku-$2\pi$Ms$^2$ becomes negative, and a perpendicular magnetization film is not obtained. A concentration of samarium is limited in a range of 5 to 50 atomic %. Adding bismuth results in a decrease of the saturation magnetization. Moreover, when bismuth is added too much, the magnetic thin film deposited on the substrate is easily peeled off. That is to say, the addition of bismuth is limited, too. This limit varies depending on a condition of deposition, e.g. bias voltage. The limit becomes low on applying a negative bias voltage to the substrate.

A magnetic thin film obtained under the above-described condition has a coercive force of 300 to 700 Oe (oersteds). The coercive force is measured in a perpendicular direction to the film by applying the magnetic field in the same direction.

As described above, a bismuth-added magnetic thin film of samarium and cobalt can have a perpendicular anisotropy without any applying a bias voltage. However, when a bias voltage is applied and at the same time bismuth is added, a magnetic thin film with a larger perpendicular anisotropic constant Ku is obtained than when only bismuth is added. For instance, under applying a bias voltage of $-40$ V, Ku becomes positive without adding bismuth. However, when bismuth is added by 20 atomic %, Ku of as much as $6 \times 10^6$ erg/cm$^3$ is obtained. With this value of Ku, a perpendicular magnetization film of Ms of about 1000 gausses can be obtained.

Next, a second effect by adding bismuth is as follows:

Usually, for reading out an information magnetically stored in the media, an electro-magnetic interaction is employed. However, when a perpendicular magnetization film as provided in the present invention is used, "magnetic Kerr effect" can be also employed. When employing Kerr effect, a large Kerr rotation-angle is preferable since a sensitivity for reading out is proportional to the angle. An effect of adding bismuth is that the described Kerr rotation-angle is enhanced. For instance, a magnetic thin film of samarium and cobalt without bismuth has the Kerr rotation angle of 0.2°. On the other hand, by adding bismuth till about 10 atomic %, the Kerr rotating angle reaches to 0.33°. However an addition of bismuth of more than 10 atomic % causes a decrease of a Kerr rotation-angle. In conclusion, an addition of bismuth of about 15 atomic % is the most favarable from a viewpoint of increasing Kerr rotation-angle.

A perpendicular magnetization film of an alloy of samarium, cobalt and bismuth in the invention is amorphous. This is verified by a X-ray diffraction measurement. This is a third distinctive feature of the invention.

That is to say, concerning such an amorphous film as in the invention a grain boundary noise can be so small that reading out under a high signal-to-noise ratio is attained. In a polycrystalline opto-magnetic film, the grain boundary noise is not negligible.

The thin film of an alloy of samarium, cobalt and bismuth in the invention has a larger perpendicular magnetic anisotropy as compared with a film of an alloy of cobalt and samarium. Furthermore it provides an optomagnetic storage with a large magnetic Kerr rotation-angle. As a result, it provides a high density magnetic storage capable of reading out easily.

A perpendicular magnetization film in the present invention and its preparation are experimentally explained by the following Examples. It is to be understood that the present invention is not limited to Examples, and various changes and modifications may be made in the invention without departing from the spirit and scope thereof.

EXAMPLES 1 TO 8

The following examinations were performed by using high frequency sputtering apparatus. The target was, as usual, arranged at the bottom side and the substrate was arranged at the upper side. This arrangement was the so-called sputter-up type. A bismuth plate having a diameter of 8 cm was placed on the target backing plate, and thereon a cobalt plate of the same diameter perforated by many holes of a diameter of 6 mm was placed and samarium chips of 1 cm square were placed on the cobalt plate.

A composition of the magnetic film was controlled by varying the number of holes and chips. A content of bismuth was proportional to the number of holes of cobalt plate.

Glasses of 1 mm thickness were used as substrates. The sputtering condition was such that a pressure of argon was $2 \times 10^{-3}$ Torr, a sputtering rate was about 1000 Å per minute, a bias voltage was not applied to the substrate, and the substrate was cooled with water. In the above-described conditions, magnetic thin films of various compositions were prepared.

Uniaxial magnetic anisotropy constant K$\perp$ perpendicular to the substrate was measured by a torque meter. The saturation magnetization Ms was measured by means of vibrating sample magnetometer. The perpendicular magnetic anisotropy constant Ku was obtained from the relationship Ku=K$\perp$+$2\pi$Ms$^2$. The results are shown in Table 1.

A coercive force Hc$\perp$ perpendicular to the film plane was 200 to 900 Oe.

The structure of the film was analyzed by means of X-ray diffraction. In any films, sharp peaks were not recognized, so that structures of the films were identified as amorphous.

COMPARATIVE EXAMPLES 1 AND 2

Magnetic thin films were prepared in the same manner as Example 1 except that the cobalt plate had no holes. In all cases, Ku's were below zero. The results are shown in Table 1.

EXAMPLES 9 TO 11

In these examples, magnetron sputtering apparatus equipped with dual targets was used and a negative bias voltage was applied to the substrate. The sputtering powers applied to each targets were independently controlled. The substrate could rotate above the targets. One target was of a samarium plate on which cobalt sectors were placed. The other target was of bismuth only. The sputtering condition was such that the pressure of argon was $1 \times 10^{-2}$ Torr, the deposition rate was about 500 Å per minute, the speed of rotation was 60 rpm, a bias voltage of $-40$ V was applied to the substrate and the substrate was cooled with water. Perpendicular magnetic anisotropy constants Ku of the obtained films were measured in the same manner as in Example 1. The results are shown in Table 2.

COMPARATIVE EXAMPLE 3

Magnetic thin film was prepared under the same condition as in Example 9 except that a bismuth was not added. Ku was positive but smaller than those in Examples 9 to 11. The result is shown in Table 2.

EXAMPLES 12 TO 15

Magnetic thin films composed of samarium, cobalt and bismuth were prepared the same condition as in Example 9. The Kerr effect was measured by means of Kerr effect hysterisis-measuring apparatus, where a light of He-Ne gas (the wave length was 633 nm) was used. The measured Kerr rotation-angles are shown in Table 3.

COMPARATIVE EXAMPLE 4

Magnetic films were prepared under the same conditions as in 12 except that bismuth was not added. The Kerr rotation-angles of the films were smaller than those in Examples 12 to 15. The results are shown in Table 3.

EXAMPLE 16

A magnetic composed of samarium, cobalt and bismuth was prepared the same conditon as in Example 9 except that a bias was not applied.

A chemical of the obtained film was $(Sm_{62}CO_{84})_{6.2}Bi_{38}$, the thickness was 1800 Å and the saturation magnetization was 410 Gausses. A perpendicular magnetic anisotropy constant was measured as $0.6 \times 10^6$ erg/cm$^3$ under external magnetic field of 17,000 Oe. A modified $Ku = K\perp + 2\pi Ms^2$ was $1.66 \times 10^6$ erg/cm$^3$. Magnetizatin curves in both directions perpendicular and parallel to the film plane were shown in FIG. 1.

TABLE 3

| | Composition of film | | Kerr rotation- |
| --- | --- | --- | --- |
| | x | y | angle (deg.) |
| Comparative Example 4 | 13.6 | 0 | 0.21 |
| Example 12 | 5.8 | 4.0 | 0.29 |
| Example 13 | 6.0 | 8.6 | 0.32 |
| Example 14 | 7.3 | 15.2 | 0.29 |
| Example 15 | 7.9 | 19.1 | 0.25 |

TABLE 1

| | Arrangement of targets | | Thickness of film (Å) | Composition of film $(Sm_xCo_{100-x})_{100-y}Bi_y$ | | Ms (G) | Ku ($10^6$ erg/cm$^3$) | Hc$\perp$ (Oe) |
| --- | --- | --- | --- | --- | --- | --- | --- | --- |
| | Number of chips of samarium | Number of holes of cobalt plate | | x | y | | | |
| Com. Ex. 1 | 15 | 0 | 3,600 | 11.6 | 0 | 640 | $-1.24$ | 50 |
| Ex. 1 | 13 | 12 | 2,600 | 8.6 | 3.1 | 1,080 | $+0.12$ | 600 |
| Ex. 2 | 12 | 20 | 3,300 | 7.2 | 5.4 | 890 | $+0.91$ | 200 |
| Ex. 3 | 15 | 34 | 3,500 | 10.3 | 9.1 | 800 | $+1.97$ | 600 |
| Ex. 4 | 13 | 35 | 3,300 | 7.7 | 9.3 | 790 | $+1.89$ | 700 |
| Com. Ex. 2 | 18 | 0 | 4,800 | 21.6 | 0 | 440 | $-1.08$ | 50 |
| Ex. 5 | 18 | 2 | 3,800 | 20.0 | 0.6 | 470 | $-1.43$ | 850 |
| Ex. 6 | 19 | 22 | 3,140 | 21.5 | 6.0 | 410 | $+0.40$ | 500 |
| Ex. 7 | 22 | 12 | 3,700 | 27.5 | 3.2 | 190 | $-1.11$ | 500 |
| Ex. 8 | 22 | 32 | 3,640 | 28.0 | 8.6 | 260 | $+0.85$ | 400 |

TABLE 2

| | Composition of film $(Sm_xCo_{100-x})_{100-y}Bi_y$ | | Thickness of film (Å) | Ms (G) | Ku ($10^6$ erg/cm$^3$) | Hc$\perp$ (Oe) |
| --- | --- | --- | --- | --- | --- | --- |
| | x | y | | | | |
| Comparative Example 3 | 5.7 | 0 | 1,800 | 1,150 | $+0.5$ | 300 |
| Example 9 | 5.8 | 4.0 | 2,000 | 1,130 | $+1.8$ | 380 |
| Example 10 | 7.9 | 19.1 | 1,800 | 1,150 | $+6.4$ | 300 |
| Example 11 | 12.3 | 25.0 | 1,600 | 1,080 | $+5.7$ | 300 |

What we claim is:

1. A perpendicular magnetization film comprising an amorphous magnetic thin film of an alloy of 5 to 50 atomic % of samarium, 0.1 to 40 atomic % of bismuth and remainder cobalt and a substrate, said amorphous magnetic thin film being supported on the substrate and having an easy magnetizing axis perpendicular to the substrate.

2. A process for preparing an amorphous magnetic thin film having an easy magnetizing axis perpendicular to a substrate, which comprises sputtering 5 to 50 atomic % of samarium, 0.1 to 40 atomic % of bismuth and remainder cobalt on the substrate.

* * * * *